United States Patent

[11] 3,617,637

[72] Inventor Patrick Henry Gorman, II
Little Silver, N.J.
[21] Appl. No. 6,370
[22] Filed Jan. 28, 1970
[45] Patented Nov. 2, 1971
[73] Assignee Bell Telephone Laboratories, Inc.
Murray Hill, N.J.

[54] SHARED WIDEBAND COMMUNICATION LINE FOR PRIVATE BRANCH EXCHANGE STATIONS
16 Claims, 5 Drawing Figs.

[52] U.S. Cl. .......... 179/2 TV,
179/17 B
[51] Int. Cl. .......... H04m11/06,
H04m 3/56
[50] Field of Search .......... 179/2 TV,
36, 37, 38, 39, 17 B; 178/6 PD

[56] References Cited

UNITED STATES PATENTS 3,335,226 8/1967 Michael .......... 179/18 C

*Primary Examiner*—Kathleen H. Claffy
*Assistant Examiner*—Tom D'Amico
*Attorneys*—R. J. Guenther and James Warren Falk

ABSTRACT: Equipment is disclosed including a shared wideband communication facility which may be key selected by private branch exchange stations or, alternatively, selected on an automatic basis to complete outgoing or incoming audio-video connections directly between line terminations of a switching office and the exchange stations.

INVENTOR
P. H. GORMAN II
BY Henry J. Walsh
ATTORNEY

SHARED WIDEBAND COMMUNICATION LINE FOR PRIVATE BRANCH EXCHANGE STATIONS

BACKGROUND OF THE INVENTION

This invention relates generally to communication systems and, in particular, to systems for conveying intelligence signals within or outside the voice frequency spectrum. More particularly, this invention concerns arrangements for selectively interconnecting private branch exchange stations with a central switching office over wideband and narrow band facilities.

DESCRIPTION OF PRIOR ART

Although serious efforts to provide visual two-way communication began as early as the late 1920's, only recently has technology advanced to the point where such communication is economically feasible on a station-to-station basis. Face-to-face communication is man's most complete and satisfying way of communicating. Whereas in the past, circumstances often required one to travel great distances to view persons or objects, today the advancing technology of station-to-station visual communications is alleviating this necessity.

Typically, special transmission and switching facilities are required to furnish audiovisual communication. These facilities must be suitable for carrying a range of frequencies much wider than voice frequencies. Moreover, proper reconstruction of a transmitted video picture requires synchronizing equipment which is dependent for proper operation on synchronizing pulses which accompany video picture signals. The cost of providing individual video channels and associated control equipment is, however, relatively high as compared with conventional audio channel equipment.

The business community has become aware of the challenging communication possibilities inherently available when visual communication supplements audio communication. As a result, there is an increasing demand for wideband services to augment private branch exchanges (PBX's) which have heretofore been limited to furnishing audio communication between exchange stations as well as between exchange stations and distance stations connected via the direct distance dialing (DDD) network.

Uniquely, this demand has initially concentrated on the necessity for providing audiovisual communications between prescribed exchange stations and distant stations which may be reached via the DDD network. The necessity for providing audiovisual intercommunication between exchange stations of PBX is of secondary importance. This development is not surprising, particularly in view of the distances which oftentimes separate business headquarters from remote plant locations. Furthermore, the entire DDD network is to be equipped for selective establishment of audiovisual paths on a station-to-station basis in the near future and can therefore provide the bulk of the required call directive switching equipment more economically than private systems.

Arrangements are presently available, generally in key telephone systems, for enabling exchange stations to connect directly to line terminations of a local switching office to establish station-to-station calls via the DDD network. Such arrangements include a separate wideband channel, an audio channel, and special control equipment which are furnished on a per station basis. Although these arrangements provide adequate service, they have proven to be too costly due primarily to the cost of the video channel equipment.

Accordingly, there is a need for a more economical audiovisual arrangement for interconnecting exchange stations with local office terminations in order that exchange stations can directly access a switching office for originating an outgoing call or for answering an incoming audiovisual call.

SUMMARY OF THE INVENTION

The deficiencies in the prior art are overcome in accordance with the principles of the present invention which enables a wideband channel, or path, to be selectively connected to any one of a plurality of exchange stations and selectively associated with any one of a plurality of audio paths to complete incoming or outgoing audiovisual calls. The provision of common video channels which are shared by a number of stations overcomes the major economic drawback of prior art arrangements.

Each exchange station is provided with individual keys for selecting common wideband channels to the exclusion of every other exchange station. The common wideband channels are also automatically selected on incoming audio-video calls and associated with particular called audio line circuits to complete inward calls to exchange stations. A novel aspect of this arrangement resides in this joint control, i.e., key selection outgoing and automatic selection incoming, of common channels and in the equipment capable of associating any of these channels with any line on a particular call.

In accordance with another aspect of this invention, if a common channel is selected, or reserved, to serve an incoming call, the selected channel is made-busy for outgoing call traffic as soon as the switching office selects the channel for an inward call. In my arrangement, a common channel cannot be associated with the called station audio line until ringing is applied thereover by the local office. Thus, there is an unguarded interval before the application of ringing on a particular line; and during this interval, an exchange station can seize the common channel. To prevent such a seizure, the channel is made-busy before the called exchange station is identified for the completion of the audio or video portion of the incoming call. The keys at exchange stations which can be depressed to select the trunk are illuminated for indicating the busy condition. In the event a station key is inadvertently depressed, apparatus of my invention prevents the establishment of an intruding connection on an existing call or the interference with the processing of a call connection.

Advantageously, in accordance with this invention, portions of the video control equipment which are ordinarily furnished on a per station basis are now incorporated as part of the common video channel equipment. The equipment includes, in particular, loopback circuitry and video continuity test circuitry, each of which is activated on every call to verify the continuity of the video channel before completing a call connection. This feature manifestly affords appreciable per station cost savings.

GENERAL SYSTEM OPERATION

Each exchange station is furnished with a combined lamp-key assembly for each common video channel which the station may select. If a lamp of an assembly is lighted, the associated channel is busy; and if a lamp is flashing, an incoming video call to the particular station is indicated. A dark lamp indicates an idle channel.

Assuming it is desired to establish an outgoing audio-video call, the station subscriber depresses a key for one of the common video channels having a dark lamp. This action causes the originating station subset to be connected to an auxiliary audio line circuit. In addition, the common video channel is reserved for a connection to the originating station via a cable equalizer terminating the common video channel. All other exchange station key assemblies associated with the selected channel are effectively disabled and the associated lamps at these stations are lighted to indicate the busy status of the video channel.

In a customary manner, the audio station loop is closed by switch hook contacts of the station subset, and the closure signal is forwarded via an auxiliary audio line circuit and an audio communication path to the switching office. At the switching office, the audio path connects to an office audio line circuit which signals the office common control circuits for establishing a connection to a register circuit to record the called address code.

As part of this inventive arrangement, there is furnished at the switching office a group busy control which connects to a video line circuit terminating the common video channel at the switching office. Group busy control also connects to all office audio line circuits which are associated with the common video channel. It is to be noted that one office line circuit and one auxiliary audio line circuit, as well as an interconnecting path, are provided for each exchange station having access to the common video path. As soon as the common video channel is seized for a call, the office audio line circuits not involved on the call are made busy by the group busy control.

The common video channel, also referred to herein as a common wideband quad, consists of a transmit pair of wires and a receive pair of wires. Prior to completion of a call connection by the office in response to receipt of an address code, the office network performs a bidirectional continuity test on the common quad to ensure that the wideband facilities of the quad are in proper working order and that there is continuity of the quad wires. Upon successful completion of the continuity test, the network sends a supervisory signal over the quad to the cable equalizer for synchronizing the calling and called video sets. Thereafter, the video set of the calling station is connected to the common channel and video communication may commence between the interconnected stations.

When the outgoing call is terminated and the receiver of the calling exchange station subset is returned to its cradle, the common video channel equipment is released and it is available for service.

Before discussing the establishment of an audio-video call inward to an exchange station, a few preliminary remarks are in order. It will be recalled that each exchange station has associated therewith one office audio line circuit per common video channel. This circuit can be utilized by the switching office to extend the audio portion of the call to the particular station. When a particular common video channel is busied, as discussed hereinbefore, all associated office line circuits are also made-busy by the action of the group busy control. However, exchange stations are ordinarily associated with more than one common video channel depending upon the desired call traffic handling capability. Thus, there may be as many as four or more office audio line circuits associated with any one exchange station, and any of these can be utilized to extend inward calls. Office line circuits associated with a single exchange station are arranged in a conventional hunting group at the office, and the sequence or order of hunting varies between exchange station line circuit groups for assuring call traffic distribution over the common channels. The determination of which line circuit is used on a particular incoming call is largely dependent therefore upon the availability of one of the common video channels associated with the called station as well as upon the idle-busy state of the called station.

The determination of the identity of the video path to be used to complete the video portion of a call is made by the switching office after the office selects an idle office audio line circuit. An equipment location translator is connected on the call and the selected office audio line circuit identity is forwarded thereto. The translator utilizes the identity and its prewired logic circuitry to ascertain the associated common video line circuit location. As soon as the location is ascertained, the office completes the video portion of the call via an office video network to the video line circuit terminating the common quad.

After an audio and video line circuit are selected for a particular call and office network connections are made, the office switching network makes a continuity test of the quad and thereafter sends a distinctive signal over the quad to the cable equalizer. This signal activates circuitry for busying the common channel to calls originated at exchange stations. Subsequently, a ringing signal is forwarded by the office over the audio communication path to the auxiliary line circuit where it is detected. The ringing signal identifies the called station and actuates video channel-to-called station connecting circuitry. The incoming call is signaled by the ringing of the appropriate station ringer and by a flashing lamp signal associated with the trunk key at the called station. All other trunk key lamps at different stations are lighted steady to indicate a busy condition. When the called station depresses the trunk key associated with the flashing lamp, the common video set and the audio path are cut through to the subset.

DESCRIPTION OF THE DRAWINGS

The foregoing objects, features, and advantages as well as others of the invention, will be more apparent from the following description of the drawing, in which.

Figure 2:
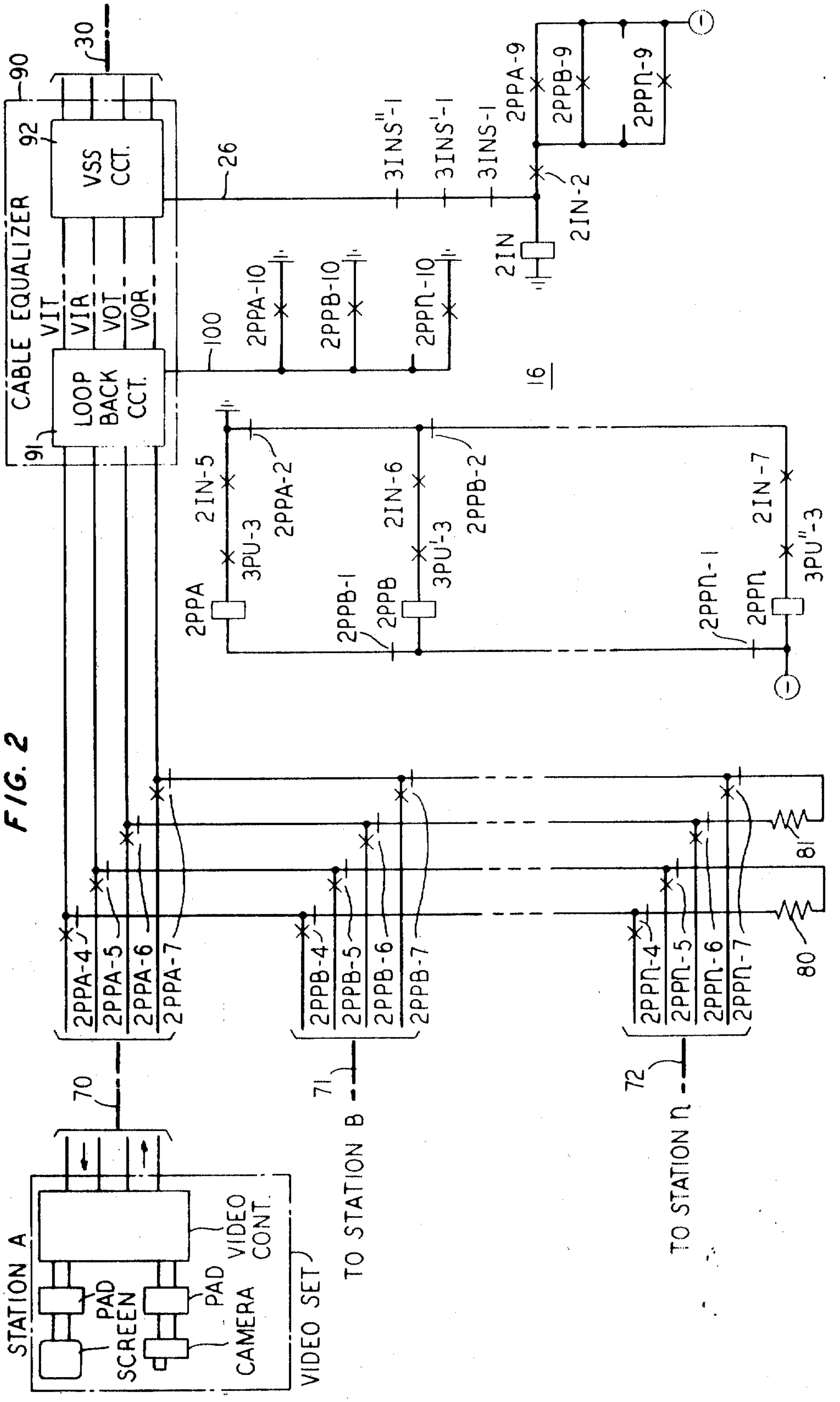
FIG. 2 is a schematic drawing showing circuit details of a station video set and a video connector.
Figure 3:
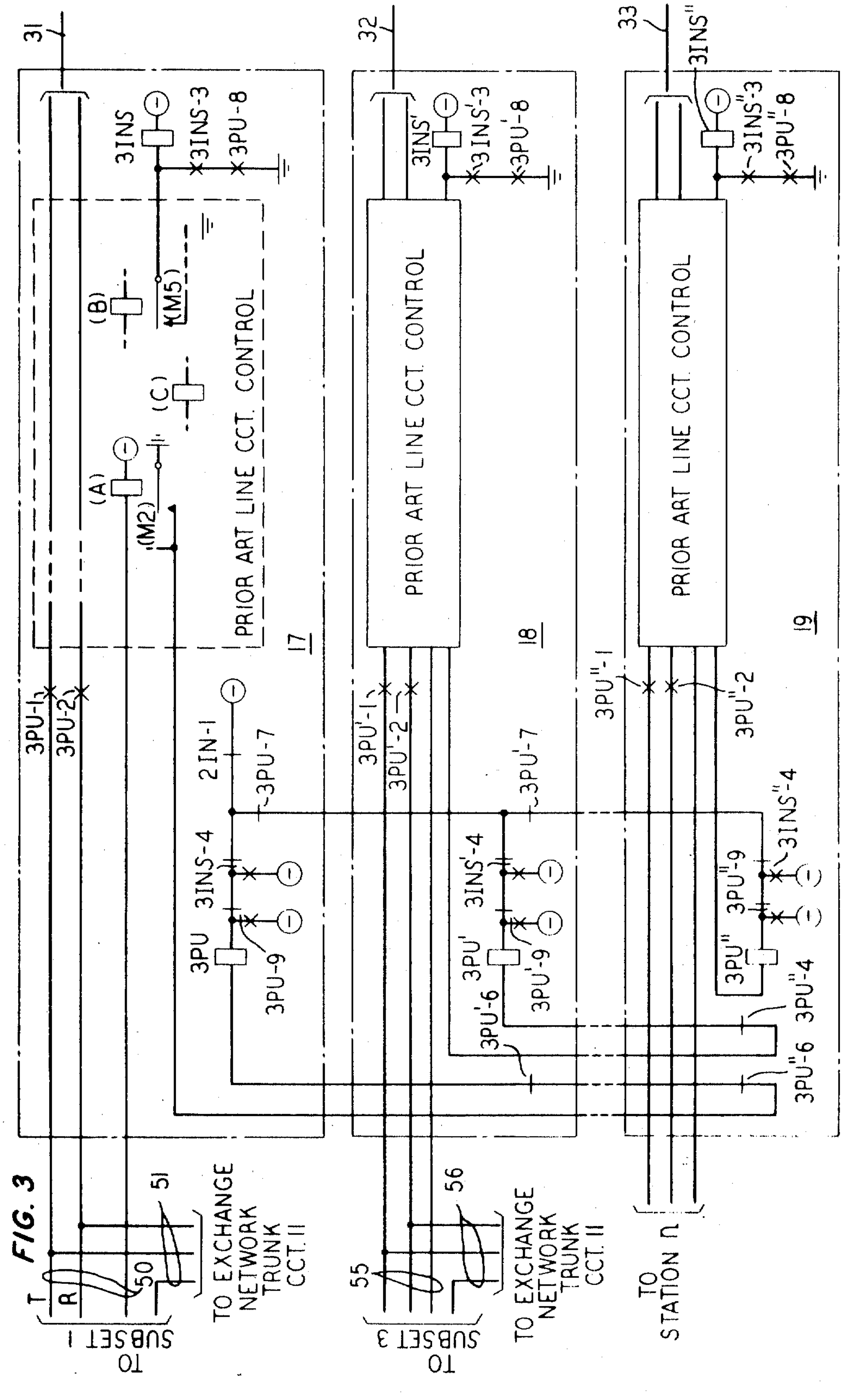
FIG. 3 depicts auxiliary line circuits.
Figure 4:
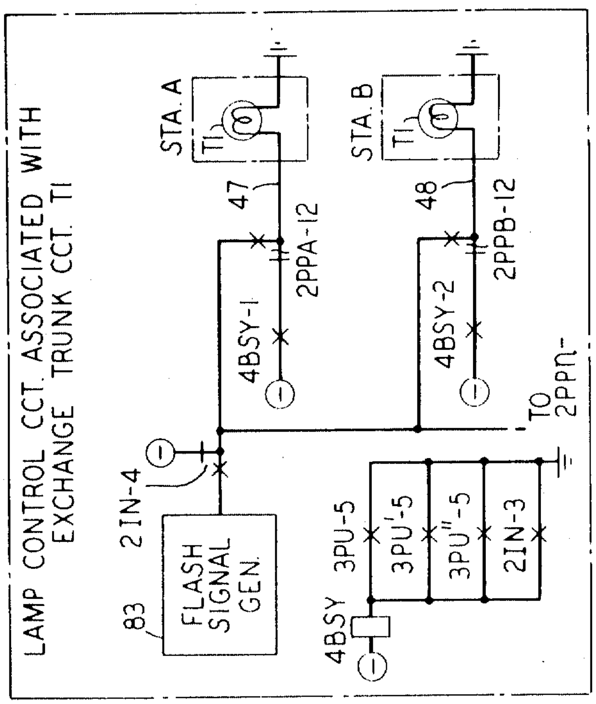
FIG. 4 shows the lamp control circuitry associated with exchange trunk circuits.

It will be noted that FIGS. 2–4 employ a type of notation referred to as "detached contact" in which an "X" shown intersecting a conductor represents a normally open contact of a relay and a bar shown intersecting a conductor at right angles represents a normally closed contact of a relay, "normally" referring to the unoperated condition of the relay. The principles of this type of notation are described in an article entitled "An Improved Detached Contact Type Schematic Circuit Drawing" by F. T. Meyer in the Sept. 1955 publication of the *Transactions of the American Institute of the Electrical Engineers, Communications and Electronics*, Vol. 74, pages 505–513.

It will be noted also that in order to simplify the disclosure and thus facilitate a more complete understanding of the embodiment, the relays, relay contacts, and other electromechanical devices shown in FIGS. 2–4 have been given schematic designations; thus, the number preceding the letters of each device corresponds to the figure in which the control device is shown. For example, the coil of relay 2IN is shown in FIG. 2. Each relay contact, either make or break, or transfer, is shown with its specific contact number preceded by the designation of the relay to which it belongs. The notation "2IN–2a" indicates a transfer contact number 2 of relay 2IN, the coil of which is shown in the same figure.

INTRODUCTION

The present invention in its operation resembles the operation of key telephone system equipment wherein any key station may be selectively connected to any one of a number of communication lines in response to the enabling of a key associated with that line. For purposes of illustration, it is intended that the audio portion of call connections be established through key telephone line circuit control equipment in a manner well known in the art. Such equipment is disclosed in the Morse et al. U.S. Pat. No. 3,239,610 issued Mar. 8, 1966. It is to be noted that the circuit control forms a part of what is termed herein an auxiliary line circuit and is shown in FIG. 3 in dashed outline. The type of circuit notation used in the Morse disclosure and reproduced herein is known as "attached contact" description. For convenience in making reference to Mores et al. the original notation was preserved.

Figure 1A:
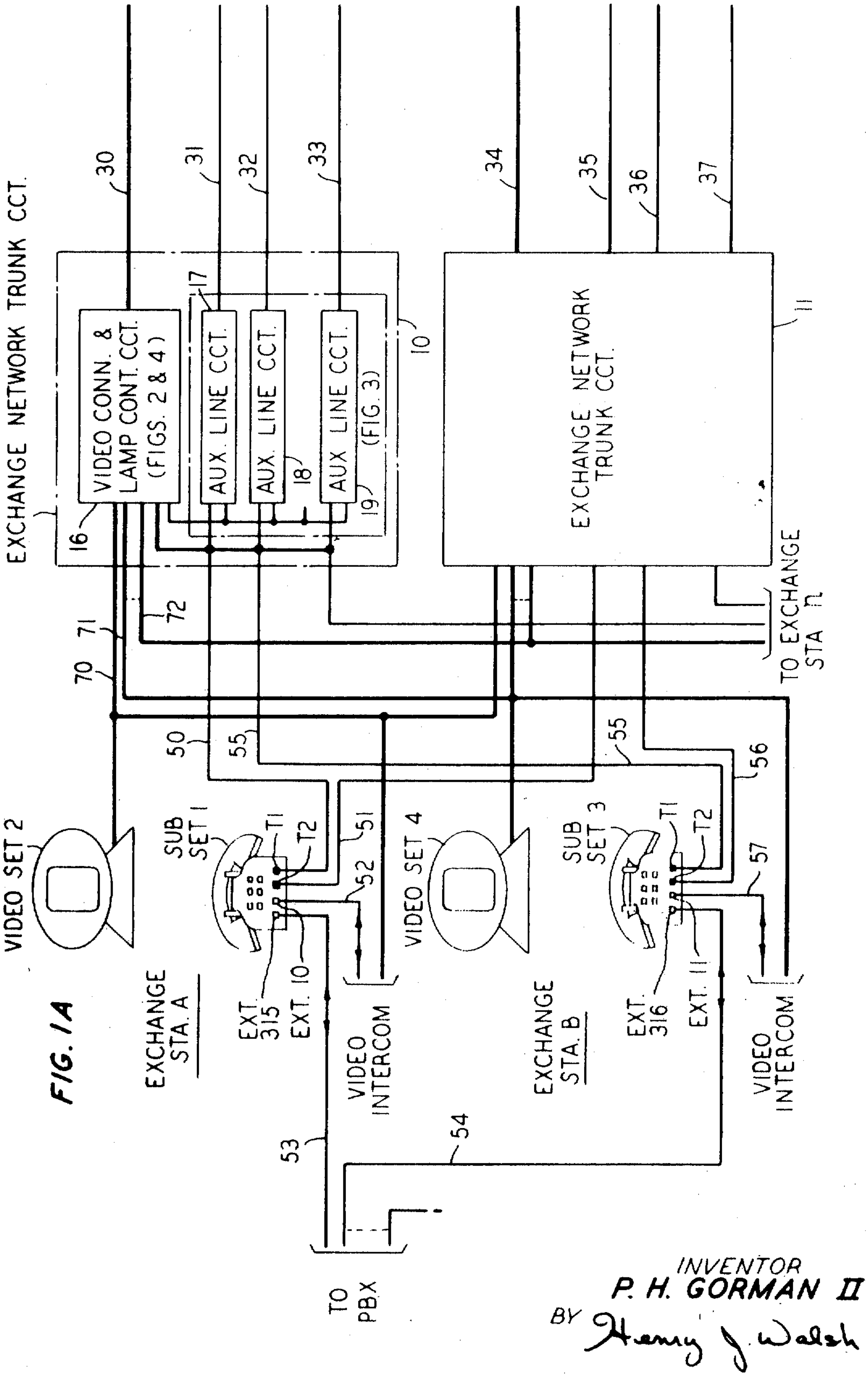
FIGS. 1A and 1B depict a block diagram showing the interrelation of component parts which comprise the exemplary embodiment of the invention.

In order to further facilitate an understanding of the invention, the description of the exemplary embodiment has been divided into a General System Arrangement portion designated 1.0 and a Detailed Description portion designated 2.0. Section 1.0 describes the essential component parts of the invention and their interrelationship with station and switching office equipment. This description will be made with respect to FIGS. 1A and 1B. Section 2.0 and its subsections describe the invention in detail with respect to FIGS. 2–4.

1.0 General System Arrangement

The present invention is illustrated utilizing two exchange stations A and B. Each station includes a subset and a video set—such as, subset 1 and video set 2 of station A. Referring specifically to subset 1, which is typical in this illustration, it has four key positions designated EXT. 315, EXT. 10, T1, and T2. The key designated EXT. 315 connects with cable 53 for establishing in a conventional manner an audio-only communication channel between subset 1 and a PBX (not shown). The key designated EXT. 10 may be actuated for connecting via cable 52 to a video intercom (not shown) for establishing the audio portion of an audio-video intercom connection. The invention herein described is principally concerned with the keys designated T1 and T2, which have been darkened in the illustrative drawing. Key T1 is associated with exchange network trunk circuit 10 for gaining access to common video channel 30. Key T2 is associated with another exchange network trunk circuit, circuit 11, for connecting to common channel 34. It is to be noted that exchange station B also is equipped with keys designated T1 and T2 and connects to the aforementioned network trunk circuits 10 and 11 via cables 55 and 56, respectively.

A video set—such as, set 2 of station A, connects to exchange network trunk circuits 10 and 11 and to the video intercom (not shown). Exchange network trunk circuits 10 and 11 are connected as well to video set 4 of station B via cable 71 and to a video set of station $n$ (not shown) via cable 72. Video path cables are shown in heavy outline.

An exchange network trunk circuit—such as, circuit 10, which is more fully illustrated, comprises a video connector for interconnecting particular station video sets via cables 70, 71, and 72 with common video channel 30. Circuit 10 further includes a plurality of auxiliary line circuits, circuits 17, 18 and 19 associated with commonly designated key position, T1, at respective stations A, B and $n$. Auxiliary line circuits 17, 18, and 19 are, in turn, connected to switching office audio line circuits 7, 8, and 9 over separate audio communication channels 31, 32, and 33. The details of the component parts of network trunk circuit 11 have been omitted in presenting this invention, since it contains the same circuitry as circuit 10 which is shown in block diagram form in FIG. 1A, and in greater detail in FIGS. 2, 3, and 4.

2.0 Detailed Description

The following text will describe the embodiment of the invention in detail with reference to FIGS. 2–4. Cursory examination of FIG. 3 will reveal that certain relay contacts and designations have been enclosed in parentheses. The parenthetical symbol indicates that the apparatus and associated circuitry is shown in more detail in prior art key telephone systems—such as, the aforementioned Morse et al. patent.

2.1 Call to Switching Office

Let it be assumed that the subscriber of station A desires to establish an audio-video call connection over one of the exchange network trunk circuits to a subscriber at a distant location. In the specific illustrative embodiment, this call may be established by depressing either key T1 or T2 of subset 1. Each key position has associated therewith a lamp for indicating the idle-busy status of the common video channel. If the channel is idle, the lamp indication is dark. Referring to FIG. 4 which discloses the lamp control circuitry for lamps T1 at stations A and B, these lamps are dark when relay 4BSY is not operated. Assuming for illustrative purposes that at station A lamp T1 is dark, the subscriber depresses that key and, with reference to the upper left-hand side of FIG. 3, forwards a signal via cable 50 for operating relay (A). Relay (A) is part of conventional prior art line control circuitry which responds to the depression of a pickup key—such as, key T1 in the present example. In operating, relay (A) closes contact (M2) for connecting ground to a winding terminal of relay 3PU which operates. It is to be noted that this operating path includes break contacts 3PU''–6 and 3PU'–6 which will prevent the operation of relay 3PU in the event the common channel had been previously selected by station B or $n$. The opposite winding terminal of relay 3PU connects to battery via break contact of transfer contacts 3PU–9 and 3INS–4, and break contact 2IN–1. Upon the operation of relay 3PU, battery potential is disconnected by operated contact 3PU–7 from the windings of relay 3PU' and 3PU'' associated respectively with station B and station $n$ for preventing the operation of those relays and therefore the seizure of the common channel. Operated transfer contact 3PU–9 furnishes battery directly to the winding of relay 3PU and places the relay under the direct control of relay (A).

Figure 1B:
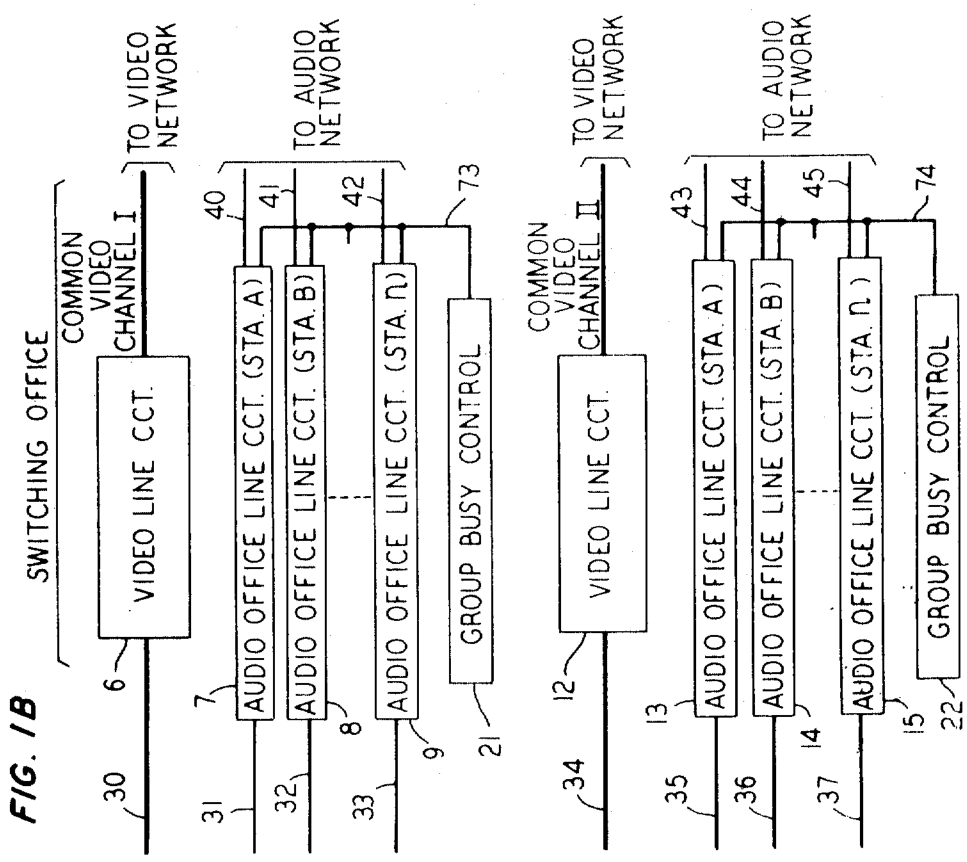

Operated contacts of relay 3PU connect subset 1 directly to audio channel 31 and prepare the operating path of relay 2PPA which controls the connection of video set 2 to common video channel 30. With reference to FIG. 3, contacts 3PU–1 and 3PU–2 connect leads T and R from subset 1 (conductors shown in heavy outline) to channel 31 for completing a path for sending a customary "loop start" signal to the office. In response to the latter signal, the switching office makes all office audio line circuits, i.e. circuits 7, 8, and 9, associated with common exchange network trunk circuit 10 appear busy. Referring to FIG. 1B momentarily, the loop seizure signal is detected by office audio line circuit 7 and, in turn, it transmits a signal over cable 73 to group busy control 21. Control 21, in turn, generates a busy signal which is sent over other conductors of cable 73 to the remaining audio line circuits 8 and 9. It is to be noted that details of the internal circuitry of control 21 are not disclosed herein, since this circuitry comprises a conventional busy control arrangement.

In response to the receipt of the loop start signal, the office controls the establishment of a connection between office audio line circuit 7 and a register circuit (not shown). This connection includes cable 40 and a path through the office audio network (not shown), the latter being established in a customary manner. The subscriber at station A can thereafter outpulse the called address for extending the audio and video connections to the called station.

Referring now to FIG. 2, relay 2PPA operates for connecting video set 2 of station A to cable equalizer 90 and therefore to common video channel 30 after the receipt of a video channel signal detected by VSS circuit 92. The local office sends a signal, termed a VSS signal, to the calling station to indicate that the channel is connected at the distant end. VSS circuit 92 responds to the signal and operates relay 2IN via lead 26, contacts 3INS''–1, 3INS'–1 and 3INS–1. Relay 2PPA operates from ground via operated contacts 2IN–5 and 3PU–3, the winding of 2PPA, break contact 2PPB–1 and break contact 2PP$n$–1 to battery. Operated transfer contacts 2PPA–4, 2PPA–5, 2PPA–6, and 2PPA–7 connect the send and receive pairs of cable 70 from video set 2 to equalizer 90. The video transmission directions are indicated by the arrow shown in FIG. 2. Operated contacts 2PPA–9 and 2IN–2 provide a path for locking relay 2IN operated until the call terminates.

The cable equalizer 90 which is serially inserted between common video channel 30 and the connected video set 2 is arranged to provide constant video signal transmission parameters regardless of the variations between the respective distances between stations A, B, and $n$ and channel 30. In addition, as will be more fully detailed hereinafter, cable equalizer 90 responds to signals from the video line circuit 6 at the switching office to provide the office, upon interrogation therefrom, with information regarding the availability and continuity of the video equipment at the exchange stations.

Cable equalizer 90 includes a loopback circuit 91 which is arranged in any one of the well-known circuit configurations to provide electrical signal continuity between a first pair of wires (send path) and a second pair of wires (receive path) of channel 30. Loopback circuit 91 is further arranged to remove the electrical continuity when a connection is established between a station video set and cable equalizer 90. More particularly, before a connection is established between any video set and the cable equalizer, leads VIT and VOT, as well as leads VIR and VOR, are interconnected by loopback circuit 91. When a connection is established between set 2 and equalizer 90, the loopback interconnections are removed in the following manner. Cable 100 shown connected to equalizer 90 is grounded by the action of operated contact 2PPA–10 and, in turn, circuitry (not shown) of loopback circuit 91 opens the interconnections. It is to be noted that there is a cable equalizer also furnished for common video channel 34, and it functions in the same manner as the aforementioned equalizer 90. The importance of the interconnections between the pairs of quad conductors will become apparent from the subsequent discussion.

Returning now to the illustrative example, upon receipt of the address code, an audio path is extended from circuit 7 via networks (not shown) of the switching office to an audio path of the called station. In addition, video line circuit 6 and video channel I are connected via a separate video network to the video channel of the called station. It is noted that the office video network connection may be established in any one of various ways which have been disclosed in prior art. For example, the arrangement disclosed in U.S. Pat. No. 3,335,226 to H. J. Michael and R. E. Watson, Jr., issued Aug. 8, 1967, may be utilized to extend the video connection.

When the call is terminated, as indicated either by restoring the handset to the cradle of subset 1 or by releasing key T1 of subset 1 (without placing the call on hold), relay (A) of FIG. 3 releases. In turn, relays 3PU, 2PPA and 2IN release for restoring exchange network trunk circuit 10 to an idle condition. Thereafter, the latter is available to establish another incoming or outgoing audio-video call.

2.2 Incoming Call Over Exchange Network Trunk Circuit 10

Assume now that a distant station dials station A to establish an audio-video call. The distant station dials a special number assigned to station A. Apparatus of the switching office tests audio line circuit 7 for its idle-busy status. It is to be noted that audio line circuit 7 is arranged in a hunting group with audio line circuit 13; therefore, in the event audio line circuit 7 tests busy, (channel I in use, for example) the call can as well be routed to station A over line circuit 13 and video channel II. Let it be assumed in this example that audio line circuit 7 is idle. After the idle-busy test is performed, equipment of the switching office utilizes the identity of circuit 7 to translate the location of the associated video line circuit 6. As soon as both identities, i.e., of the audio and the video line circuits, are determined, connections are completed via office networks from the calling party to audio channel 31 and common video channel 30.

The office network performs a continuity test on the wideband video quad, channel 30, before releasing from the call connection. The continuity test is a bidirectional test which consists primarily of the transmission of a distinctive signal over one pair of the video quad and the detection of that signal as returned via the other pair of the video quad. For this purpose, as shown in FIG. 2, leads VIT and VIR (receive conductors) and VOT and VOR (send conductors) are interconnected by loopback circuit 91 as hereinbefore described.

If the switching office receives a negative response from the bidirectional test on the video quad, the connection to video line circuit 6 and audio line circuit 7 is released and the call is retried over a different exchange network trunk circuit. Assuming in the present example that an affirmative response is received on the bidirectional test, the switching office applies a VSS signal to the wideband quad. This signal is detected by VSS circuit 92, which circuit may be arranged in any one of the well-known circuit configurations to provide a potential on lead 26.

In the present inventive arrangement, the VSS signal is utilized to indicate an incoming call and to actuate circuitry which busies the common video channel I for outgoing calls from any exchange station. It is to be noted that the VSS signal is forwarded and received before ringing is ordinarily applied to audio line circuit 7. Thus, advantageously, apparatus of this invention is capable of making the common channel equipment busy to station originated calls as soon as the equipment is seized by the switching office. In particular, circuit 92, upon receipt of the VSS signal, applies on lead 26 a potential which is conveyed via contacts 3INS″–1, 3INS′–1, and 3INS–1 for operating relay 2IN.

Referring now to FIG. 3, operated contact 2IN–1 removes battery from the windings of relays 3PU, 3PU′, and 3PU″. Therefore, the operation of a key, in the present example, key T1, and the subsequent operation of relay (A) does not operate any of the pickup relays (3PU–) preventing connection to the busy common video channel as well as the establishment of an audio path connection. The lamp also designated T1 at each subset is lighted steady indicating a busy condition. With reference to FIG. 4, relay 4BSY is operated over an obvious path which includes contact 2IN–3. A circuit for lighting lamp T1 of station A may be traced from battery through operated contact 4BSY–1, nonoperated contact of transfer contact 2PPA–12, and cable 47.

It is noted that a connection cannot be extended from common video channel 30 via cable equalizer 90 to the called station video set until the particular called station is identified. The called station is identified when ringing is applied to one of the auxiliary line circuits 17, 18, and 19. In the present example, ringing will be applied in a customary manner at the switching office and conveyed over channel 31 to auxiliary line circuit 17. The ringing signal is detected by relay (B) shown on FIG. 3. The latter relay is part of conventional prior art line control circuitry. Upon the operation of relay (B), ground is applied via contact (M5) for operating relay 3INS. Operated contacts of relay 3INS cause the lamp at the called station to flash and also prepare the operating path of relay 2PPA which connects cable equalizer 90 to the called video set 2 of station A when the called station answers.

Referring to FIG. 4, lamp T1 of station A is connected by operated make contacts of transfer contacts 2PPA–12 and 2IN–4 to flash signal generator 83 which furnishes an interrupted battery signal for causing lamp T1 of station A to flash at a predetermined rate.

The called party answers the incoming call by depressing key T1 associated with the flashing lamp. In a customary manner, relay (A) operates and, in turn, relay 3PU operates. It is noted that only the called station can answer the incoming call. With reference to FIG. 3, this obtains because contact 3INS–4 connects battery to the winding of 3PU and contact 2IN–1 disconnects battery from all other pickup relay windings. Relay 2PPA is operated by relay 3PU for connecting equalizer 90 to the called video set 2.

Referring now to FIG. 2, a path may be traced for operating relay 2PPA from ground operated contacts 2IN–5 and 3PU–3, the winding of relay 2PPA, and break contacts 2PPB–1, and 2PPn–1 to battery. As may be seen, operated contacts of transfer contacts 2PPA–4, 2PPA–5, 2PPA–6, and 2PPA–7 connect the video transmit and receive conductors of cable 70 from the called video set 2 to equalizer 90.

Contacts 3PU–1 and 3PU–2 connect audio channel 31 to subset 1 to complete the audio portion of the call. Relay 3INS, which it will be recalled operated in response to ringing on channel 31, is held operated over a path which includes contact 3INS–3 and 3PU–8 to ground.

What is claimed is:

1. A communication system for establishing audio and wideband path connections between a switching office and a plurality of stations comprising, a wideband path common to said stations extending from said office, a plurality of audio paths extending from said office each associated with a separate one of said stations, means detecting a ringing signal on one of said audio paths, and means controlled by said detecting means and responsive exclusively to a connect signal from the particular called one of said stations associated with said one audio path for connecting said wideband path to said called station.

2. The system set forth in claim 1 further including means responsive to said connect signal for establishing a connection from said called station to said one audio path.

3. A communication system in accordance with claim 1 further including means at each of said stations for selecting said wideband path to originate a call to said office, means responsive to the actuation of said selecting means for establishing a connection between an originating one of said stations and one of said audio paths associated with said originating station, and means reserving said wideband path for an exclusive connection to said originating station.

4. A communication system in accordance with claim 1 further including a second wideband path and a second plurality of audio paths, said second wideband path being common to all of said stations and each station having one of said second plurality of audio paths individually associated therewith, and means detecting a ringing signal on one of said second plurality of audio paths for reserving said second wideband path for connection to the one of said stations individually associated with said one path of said second plurality of audio paths.

5. The invention recited in claim 1 further including means responsive to the receipt of a special signal on said wideband path before the detection of said ringing signal for disabling said connecting means to prevent the establishment of a connection between any of said stations and said wideband path.

6. The invention recited in claim 5 further including means also responsive to said special signal for indicating a busy condition of said wideband path at each of said stations.

7. The invention recited in claim 6 further including means controlled by said detecting means for altering said indicating means to indicate a calling condition rather than a busy condition at said called station.

8. An arrangement including a common wideband channel for supplementing any one of a plurality of audio paths to furnish audio-video communications between key-equipped telephone stations and a switching office comprising, a key at each of said stations exclusively associated with the selection of said channel, means responsive to the operation of said key at one of said stations for controlling the establishment of a connection between one of said audio paths and said one station, and means actuated by said controlling means and responsive to a signal on said channel from said office for connecting said channel to said one station.

9. The invention set forth in claim 8 further including means actuated by said controlling means for preventing establishment of a second connection from said channel and audio paths to another of said stations in response to the operation of a second one of said keys at a different one of said stations.

10. Equipment interposed between a plurality of audio paths extending between exchange stations and a switching office for providing shared access to a wideband channel to augment said paths comprising, means selectively actuated from any one of said stations for reserving said channel for the exclusive use of said one station, means controlled by said reserving means for excluding all stations except said one station from connecting to said audio paths, means actuated by said reserving means for connecting a prescribed one of said paths to said one station, and means responsive to a signal from said office for connecting said channel to said one station, said signal being sent by said office after the receipt of a call address by said office.

11. A communication system for establishing audio and wideband path connections between a switching office and a plurality of stations each of which includes a video set and an audio set comprising a plurality of wideband paths each common to a plurality of said stations and extending from said office, a plurality of audio paths extending from said office, and a control means individually associated with one of said wideband paths and with a distinct group of said audio paths, each one of said control means being connected to said video set and audio set of each station and including an auxiliary line circuit connected to each audio path of said associated distinct group, each one of said auxiliary line circuits including means for detecting a ringing signal on said audio path connected thereto, and means controlled by said detecting means and responsive exclusively to a signal from one of said stations individually associated with said audio path over which said ringing signal is detected for connecting said one station to the one of said wideband paths associated with the one of said distinct groups containing said last-mentioned audio path.

12. A communication system in accordance with claim 11 wherein said control means includes lamp control circuitry for indicating the idle-busy state of said wideband paths at each one of said stations.

13. A communication system in accordance with claim 11 wherein said control means includes means activated on a call originated at a calling one of said stations for reserving a particular one of said wideband paths, and means actuated by said reserving means for controlling the establishment of a connection from said calling station to one of said audio paths which is included in the distinct group associated with said reserved wideband path.

14. A communication system in accordance with claim 13 further including means responsive to the receipt of a signal on said reserved wideband path for controlling the connection of said reserved wideband path to said calling station.

15. Control circuitry for a communication system wherein a plurality of common wideband channels and individual audio paths are provided to a switching office for a plurality of stations, each wideband channel being common to all said stations and each station having one audio path associated with each wideband channel, said control circuitry including means detecting a ringing signal on one of said audio paths associated with a wideband channel and means controlled by said detecting means and responsive to a signal from a station associated with said one audio path for connecting said associated wideband channel to said station associated with said one audio path.

16. In combination, a plurality of lines extending from a local switching office, a plurality of stations each associated with prescribed ones of said lines, key means at each of said stations for controlling the establishment of a connection to associated ones of said lines, a common wideband channel extending from said office and connectable to any one of said stations, means responsive to the receipt of a first signal on said channel indicating a call to an unidentified one of said stations for sending a channel-busy indication to every station, means also responsive to the receipt of said first signal for preventing a connection of said lines to said stations in response to actuation of said key means at any of said stations, means responsive to the receipt of a second signal on one of said lines for identifying the called one of said stations, means activated by said identifying means for indicating a calling condition at said called station, and means exclusively controlled by actuation of said key means at said called station for establishing a connection from said one line as well as said channel to said called station.

* * * * *